United States Patent
Weichert

(10) Patent No.: US 9,014,553 B2
(45) Date of Patent: Apr. 21, 2015

(54) SIGNAL REFLECTION APPARATUS FOR TESTING OPTICAL FEEDBACK

(71) Applicant: Tesat-Spacecom GmbH & Co., KG, Backnang (DE)

(72) Inventor: Andreas Weichert, Backnang (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 18 days.

(21) Appl. No.: 13/924,736

(22) Filed: Jun. 24, 2013

(65) Prior Publication Data
US 2013/0343746 A1 Dec. 26, 2013

(30) Foreign Application Priority Data
Jun. 25, 2012 (DE) .................. 10 2012 012 410

(51) Int. Cl.
 H04B 10/08 (2006.01)
 H04B 10/071 (2013.01)
 H04B 10/07 (2013.01)
 H04B 10/118 (2013.01)

(52) U.S. Cl.
 CPC .............. *H04B 10/071* (2013.01); *H04B 10/07* (2013.01); *H04B 10/118* (2013.01)

(58) Field of Classification Search
 CPC .... H04B 10/11; H04B 10/112; H04B 10/114; H04B 10/1141; H04B 10/1143; H04B 10/1149; H04B 10/118; H04B 10/1121; H04B 10/07; H04B 10/071; H04B 10/1123; H04B 10/116

USPC ......... 398/130, 128, 129, 131, 135, 136, 118, 398/119, 120, 121, 122, 123, 124, 125, 126, 398/127, 16, 172, 169, 170; 385/89, 90, 92, 385/93

See application file for complete search history.

(56) References Cited

U.S. PATENT DOCUMENTS

| | | | |
|---|---|---|---|
| 7,885,547 B2 * | 2/2011 | Nakaso et al. | 398/130 |
| 2002/0131121 A1 * | 9/2002 | Jeganathan et al. | 359/152 |
| 2007/0091299 A1 | 4/2007 | Wang et al. | |
| 2007/0272834 A1 | 11/2007 | Nagasaka | |
| 2008/0258040 A1 | 10/2008 | Sun et al. | |

OTHER PUBLICATIONS

European Search Report with partial English translations dated Oct. 10, 2013 (Two (2) pages).

* cited by examiner

*Primary Examiner* — Hanh Phan
(74) *Attorney, Agent, or Firm* — Crowell & Moring LLP

(57) ABSTRACT

A satellite test signal reflection apparatus for testing transmitters sending out optical signals, the apparatus includes a plate that is at least partially permeable to optical signals. The plate has a base with a first surface with a residual reflective coating and a second surface. The residual reflective coating is configured to split an optical beam, which penetrates the plate in a first direction from the first surface to the second surface, into a reflective optical beam and a transmitted optical beam.

19 Claims, 2 Drawing Sheets

SIGNAL REFLECTION APPARATUS FOR TESTING OPTICAL FEEDBACK

CROSS-REFERENCE TO RELATED APPLICATIONS

The present application claims priority under 35 U.S.C. §119 to German Patent Application No. 10 2012 012 410.4, filed Jun. 25, 2012, the entire disclosure of which is herein expressly incorporated by reference.

FIELD OF THE INVENTION

Exemplary embodiments of the present invention relate to apparatuses for testing optical signal feedback. Specifically, exemplary embodiments of the present invention relate to a satellite test signal reflection apparatus for testing transmitters sending out optical signals, a transmission and reception arrangement for transmitting optical signals and a satellite.

BACKGROUND OF THE INVENTION

Active optical devices, i.e. devices emitting optical radiation, and passive optical devices, i.e. devices receiving optical radiation, can be used to transmit optical signals and data. Active optical devices are typically subjected to testing at defined fixed or variable intervals to check signal transmission. Such testing can be performed in a suitable optical test environment that simulates the application scenario of the optical device.

In an optical communication system, for example, the application scenario of a device is the simulation of the optical remote station by an appropriate test system. Apparatuses, which generate special test signals, can be used in the context of such a test or series of such tests and appropriate readings taken from the device to be tested. The increasing complexity of optical devices can increase the need for such tests and increase test system requirements.

In order to reduce the costs involved in such tests, internal testing equipment can be disposed on optical devices, consequently placing the respective device in a position to independently perform a series of tests.

SUMMARY OF THE INVENTION

Exemplary embodiments of the present invention are directed to a satellite test signal reflection apparatus that enables high power attenuation of the optical test signal, thus reducing the thermal power loss typically associated with the attenuation or introduction of thermal energy into the satellite test signal reflection apparatus.

According to a first aspect of the invention, a satellite test signal reflection apparatus for testing transmitters emitting optical signals includes a plate configured to be at least partially permeable to optical signals. The plate has a base, a first surface and a second surface, wherein the first surface has a residual reflective coating. The residual reflective coating is configured to split an optical beam, which penetrates the plate in a first direction from the first surface to the second surface, into a reflecting optical beam and a transmitting optical beam, wherein the plate is configured to diffuse the transmitting optical beam as it leaves the base.

The satellite test signal reflection apparatus can be configured for use in a vacuum or in space.

The plate can be a glass plate, for example, or another plate at least partially permeable to optical signals or light. The plate is configured to pass or transmit only a fraction of an incoming optical signal from the optical power, wherein another portion of the optical power of an incoming optical signal, for example, can be reflected.

The first surface and the second surface can be arranged on the base such that the first surface is opposite the second surface. The residual reflective coating, which is arranged on the first surface, is configured to reflect a portion of the optical power of an optical signal that hits the residual reflective coating. The non-reflected portion of the optical power of the optical signal is allowed to pass through the residual reflective coating and the base of the plate.

The satellite test signal reflection apparatus is therefore suitable for testing transmitters in small spaces, for example transmitters on satellites, which are usually provided with a ground station for data transmission and data communication.

The residual reflective coating on the first surface of the plate ensures that the optical signal sent by the transmitting transmitter reaches a receiver at a reduced optical power, wherein the transmitter, the receiver and the satellite test signal reflection apparatus can be arranged on board a satellite, several meters apart, for example, less than 10 or 20 meters, or several centimeters, for example, less than 50 cm or in particular 10 cm. A total reflection or virtual total reflection of the optical signal sent by the transmitter to the receiver could damage or destroy the receiver, since, due to the great distance of a satellite from the earth's surface, the receiver is configured to receive optical signals with substantially lower optical power than the power with which the optical signals are sent by the transmitter.

The second surface of the plate configured to diffuse light ensures that light or optical signals allowed to pass through by the plate are diffused. This means that the angle of incidence of the transmitted optical beam does not correspond to the emergent angle with respect to the second surface, but rather that the light is distributed or diffused in a complete half space on one of the two sides of the second surface. The half space is a space on one side of the plane that is spanned by the plate. This plane thus divides the complete space into two half spaces. The second surface can diffuse a portion of the light or optical beams and transmit another portion.

The diffusion of the transmitted optical beams by the second surface configured to diffuse light guarantees that the receiver receives a greatly attenuated reflected optical signal from the optical power of the optical signal sent by the transmitter. A signal can reach the receiver from the transmitted optical beam, which is diffused by the second surface, which, with reference to the optical signal sent by the transmitter, is attenuated by, for example, 90 dB or more.

The optical signal reflected by the residual reflective coating on the first surface can, with reference to the optical power of the optical signal sent by the transmitter, be attenuated by, for example, 30 dB. As a result of the significant difference in attenuation level of the transmitted optical beam and also extraneous or stray light and the attenuation level of the reflected optical beam (at the example attenuation levels cited this is 60 dB), there is an adequate signal-to-noise ratio and consequently, the reflected optical beam, i.e. the useful signal, can be differentiated from the diffused light, i.e. the noise signal.

Extraneous light or stray light, for example from the sun or other light sources, which hits the plate, is also diffused by the second surface such that this only results in a slight introduction of heat into the satellite test signal reflection apparatus.

The optical beams can generally be electromagnetic waves in the visible range, infrared range or ultraviolet range.

According to an embodiment of the invention, the second surface of the plate is configured to be optically diffusing.

This enables the optical radiation transmitted by the plate to be diffused by the second surface. The second surface thus ensures, particularly in the event of a high-energy bundled optical signal, such as a laser beam, for example, a flat distribution of the optical power of the signal. The second surface configured to be light diffusing can, for example, also be configured to diffuse a fraction of the optical power of the transmitted optical signal back to the first surface, wherein the optical radiation diffused by the second surface is diffused into a complete half space, wherein the half space is located in relation to the first surface on the side opposite the base and the second surface of the plate.

According to one embodiment of the invention, the base of the plate is configured to be optically diffusing.

This means that the base optically diffuses a bundled optical beam, such as a laser beam, for example, in such a manner that the radiation or light respectively is diffused two-dimensionally by the base of the plate.

As a result, the introduction of thermal energy by a laser beam, in particular, can be reduced, since the transmitted optical beam is diffused by the base into a complete half space in front of or behind the plate in relation to a conducting direction of the optical signal.

The plate configured to be optically diffusing or the base of the plate configured to be optically diffusing also prevents all of the optical power of the optical signal from the transmitting transmitter from being reflected in the same direction.

According to a further embodiment of the invention, the plate has an optically diffusing coating.

The optically diffusing coating generally has the same task and function as the base configured to be optically diffusing. The optically diffusing coating can be used as an alternative to or in addition to the base of the plate configured to be optically diffusing.

According to one embodiment of the invention, the optically diffusing coating is arranged between the residual reflective coating and the base.

The optically diffusing coating can be arranged in particular directly between the residual reflective coating and the base, which means that the optically diffusing coating is in direct adhesive contact in each case with the residual reflective coating and the base.

According to a further embodiment of the invention, the residual reflective coating is configured to reflect less than 10 per mill, more particularly less than 5 per mill, more particularly less than 2 per mill, more particularly 1+/−0.5 per mill of an optical power of the optical beam.

The receiver is typically configured to detect or receive signals of substantially lower optical power than the optical power of the signals that are sent by the transmitter. If the satellite test signal reflection apparatus is arranged at a distance of a few meters from the transmitter or receiver, then this short distance, for example from a few meters to a few centimeters, does not result in any corresponding attenuation of the optical power of the optical beam since there is no great distance between the transmitter and the receiver either. For this reason, the residual reflective coating has to attenuate the optical power of the optical beam.

The satellite test signal reflection apparatus can therefore be used in existing transmitters and receivers without, for example, having to change the range of optical power that can be received by the receiver.

Consequently, not only the retrofitting or modification of existing components can be avoided, but also the use of additional components in the receiver, which is extremely important in the aerospace and aeronautics industries, since every component that is not used or cut down on in aircraft or spacecraft can provide weight advantages.

For example, the residual reflective coating has a reflection coefficient of one per mill or up to one per mill of the original optical power of a beam sent by the transmitter and hitting the plate and consequently, the optical power of the optical beam reflected to the receiver corresponds to one per mill of the optical power of the transmitter. This reduction, together with a potential reduction in transmission power, can be sufficient to not damage the optical system of the receiver as a result of the optical power being too high and to be within a receiving dynamic range of the receiver, i.e. a power range in which the optical power of a received optical signal may be located.

If the transmission power of the transmitter can be adjusted, in particular reduced, the use of residual reflective coatings with a reflection coefficient of more than one per mill is also possible. For example, if the transmission power can be halved, the reflection coefficient can be 2 per mill. If the optical power of the transmitter can be reduced to 20%, the reflection coefficient of the residual reflective coating can even be 5 per mill. Finally, the reflection coefficient of the residual reflective coating can be 10 per mill if the optical power of the transmitter can be reduced to a tenth of the original power.

Naturally, intermediate reflection coefficients of residual reflective coatings are possible. In particular, a tolerance of +/−0.5 per mill is conceivable and possible for all reflection coefficients.

Both the increase in reflection coefficients, i.e. a change in the reflection coefficient from one per mill to 10 per mill, for example, as well as the allowance of tolerance ranges in respect of reflection coefficients, can reduce the complexity and costs of manufacturing the plate and, in particular, the residual reflective coating.

According to a further embodiment of the invention, the satellite test signal reflection apparatus has a shield with an inner surface, wherein the shield is arranged such that the inner surface is arranged opposite the second surface of the plate, wherein the inner surface is configured to be reflective at least in one portion and consequently the diffused optical beam leaving the plate is reflected back to the plate.

The shield can be configured here both to fix the plate in position as well as to mechanically couple the satellite test signal reflection apparatus to a satellite or any other aircraft or spacecraft, for example.

The inner surface of the shield receives the transmitted optical beam, which leaves the plate on the second surface.

A portion of the inner surface, i.e. part of the surface of the inner surface or the whole surface of the inner surface, can be configured to be reflective and consequently the transmitted light or the transmitted optical beam, which leaves the second surface, is reflected back to the second surface. When the optical beam reflected from the inner surface hits the second surface, the second surface of the plate again optically diffuses the beams and consequently the optical beams are diffused in the half space proceeding from the second surface in the direction of the first surface of the plate.

Since the inner surface reflects the optical beams hitting it and does not simply absorb them, the introduction of thermal energy into the satellite test signal reflection apparatus and in particular into the shield can be reduced or even prevented. This applies both to the optical beam from the transmitter as well as to extraneous and stray light, such as sunlight.

Reducing the introduction of thermal energy into the satellite test signal reflection apparatus can guarantee a uniform reflected signal without high losses of optical transmission quality. Furthermore, in this case the satellite test signal reflection apparatus can dispense with cooling, which could prove necessary if the introduction of thermal energy is caused as a result of optical beams being absorbed.

According to one embodiment of the invention, at least one portion of the inner surface of the shield is configured to be optically diffusing. This means that light or optical radiation hitting the inner surface is diffused upon reflection of the optical radiation.

The optically diffusing region can extend over the whole of the inner surface of the shield or over a portion of the inner surface of the shield. The portion of the inner surface configured to be optically diffusing can be as large as or larger or smaller than the portion of the inner surface configured to be reflecting.

According to a further aspect of the invention, a transmission and reception arrangement for transmitting optical signals is disclosed. The transmission and reception arrangement has a transmitter, a receiver, a satellite test signal reflection apparatus as described above and below and a mechanical coupling, which is configured to mechanically couple the transmitter, receiver and the satellite test signal reflection apparatus to each other. Here the mechanical coupling is configured to position the satellite test signal reflection apparatus in relation to the transmitter and to the receiver in a test position such that an optical signal sent by the transmitter is reflected by the residual reflective coating the direction of the receiver.

The mechanical coupling can be a retaining bracket, for example, which is arranged on a satellite. The transmitter and the receiver can each be configured such that they exchange optical signals with a ground station in an operating mode and in a test position of the satellite test signal reflection apparatus are turned such that the transmission and reception arrangement can perform a series of tests on the transmitter and the receiver.

According to one embodiment, the transmitter is configured to send an optical test signal in the test position of the satellite test signal reflection apparatus, wherein the receiver is configured to receive a test signal reflected by the plate, wherein the transmission and reception arrangement is configured to determine signal transmission quality on the basis of the test signal sent and received.

According to a further aspect of the invention, a satellite includes a transmitter for sending optical signals, a receiver for receiving optical signals and a satellite test signal reflection apparatus as described above and below. The satellite test signal reflection apparatus is configured here, in a test position, to reflect an optical test signal sent by the transmitter in the direction of the receiver and consequently the receiver receives the reflected optical test signal, wherein the satellite is configured by means of the sent optical test signal and the reflected optical test signal to determine the signal transmission quality of the transmitter and the receiver.

In addition to determining the quality of signal transmission, it is also possible to determine whether the transmitter and the receiver fulfill specific function parameters.

The test position can be adopted in particular by positioning the transmitter and the receiver such that these are each facing the satellite test signal reflection apparatus.

BRIEF DESCRIPTION OF THE FIGURES

The embodiments of the invention are described in more detail below using the attached drawings.

DETAILED DESCRIPTION

The representations shown in the figures are schematic and are not true to scale.

If the same reference signs are used in the following descriptions of the figures, these relate to the same or similar elements.

Figure 1:
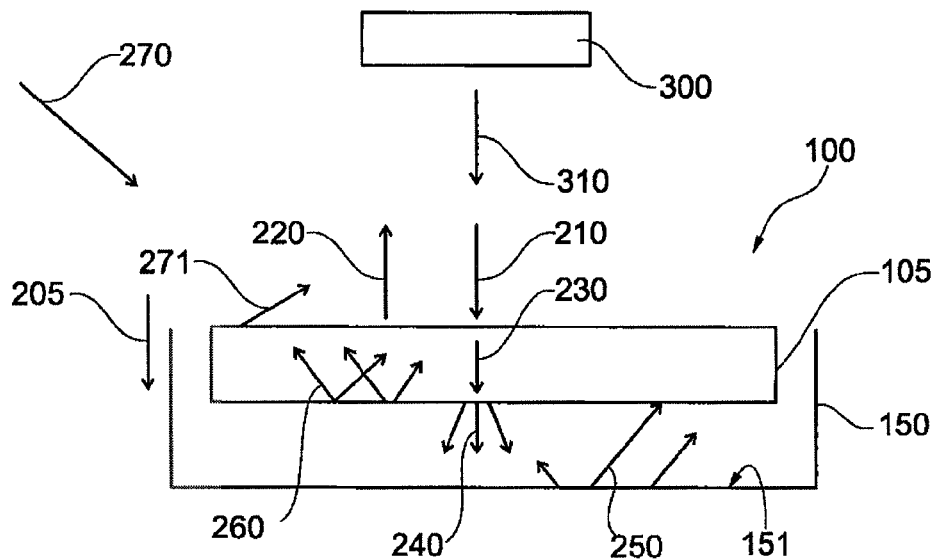
FIG. 1 shows a satellite test signal reflection apparatus according to an embodiment of the invention.

FIG. 1 shows a satellite test signal reflection apparatus 100, wherein a transmitter 300 and the corresponding optical beams are represented for illustration purposes and are described in detail below.

The satellite test signal reflection apparatus 100 has a plate 105 and a shield 150. Optical signals 310, which are emitted by the transmitter 300 in the direction of the satellite test signal reflection apparatus 100, first hit the plate 105 as optical beams 210. Here, the optical beams 210 are split into a reflected optical beam 220 and a transmitted optical beam 230, wherein the reflected optical beam 220 is reflected in the direction of a receiver (not shown) and wherein the transmitted optical beam 230 is transmitted by the plate 105 and leaves the plate on the surface facing the transmitter 300 as diffused optical beams 240. Some of the optical power of the transmitted optical beams 230 can be diffused back in the direction of the first surface once these have hit the second surface forming in the process the optical beams diffused by the second surface 260, which can leave the base or the first surface in the half space in the direction of the transmitter, wherein however, only a small portion arrives at the receiver, for example, through the diffusion.

Furthermore, FIG. 1 shows extraneous or stray radiation 270, some of which is reflected by the first surface as reflected extraneous radiation 271. The portion of the extraneous radiation 270, which is transmitted through the first surface and/or the base of the plate, can also be diffused by the second surface.

The optical beams 220, 271 are thus optical beams reflected by the first surface or a residual reflective coating on the first surface, the optical beams 240, 250, 260 are diffused optical beams, in particular scattered optical beams, and the optical beam 230 is a transmitted optical beam.

The diffused optical beam 240 is reflected by the inner surface 151 of the shield 150 and consequently sent again to the plate 105. The inner surface 151 can also optically diffuse the optically diffused beams 240 such that the optical beams 250 diffused and reflected by the inner surface 151 are reflected to the plate 105 and these are transmitted and emitted separately in the half space between the plate 105 and the transmitter 300.

The optical beam 210 is sent from the transmitter 300 in a direction 205 to the satellite test signal reflection apparatus 100, wherein the reflected optical beam 220 runs exactly counter to the direction 205 and consequently the reflected optical beam 220 can be detected by a receiver. In contrast to this, the optical beams 250 reflected from the inner surface 151 of the shield 150 are not target oriented, oriented counter to the direction 205 or anti-parallel and consequently the reflected optical signal or the reflected optical beam 220 is reflected substantially by the plate 105 specifically in its direction towards the receiver.

As FIG. 1 clearly shows, the diffused optical beams 240 are also reflected in an optically diffused manner by the inner surface 151 of the shield 150 such that only a small amount of thermal energy is introduced by the optical beams into the satellite test signal reflection apparatus 100 or no thermal energy is introduced at all.

Figure 2:
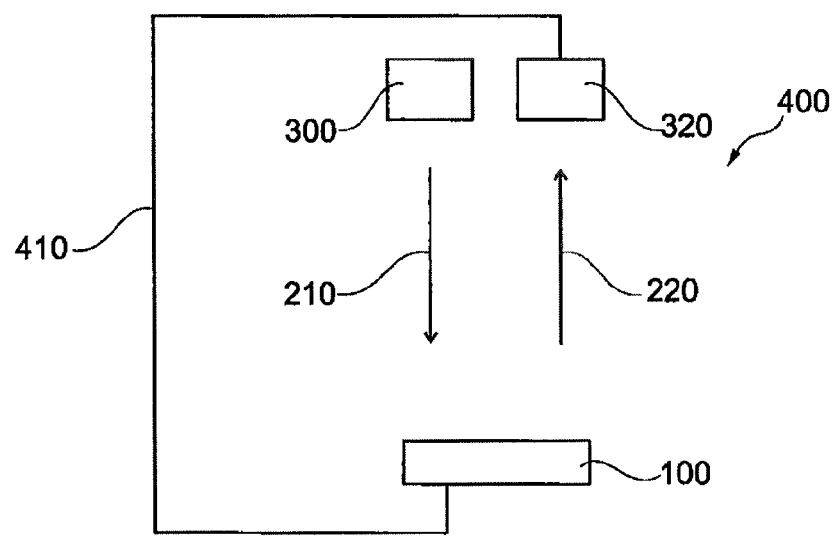
FIG. 2 shows a transmission and reception arrangement according to a further embodiment of the invention.

FIG. 2 shows a transmission and reception arrangement 400, which has a transmitter 300, a receiver 320 and a satellite test signal reflection apparatus 100.

Transmitter, receiver and satellite test signal reflection apparatus are mechanically coupled using a retaining bracket or a mechanical coupling. The transmitter 300 sends an optical beam 210 in the direction of the satellite test signal reflection apparatus, which reflects the reflected optical beam 220 to the receiver 320.

The mechanical coupling can also be a satellite housing, for example, on which both transmitter/receiver and the satellite test signal reflection apparatus are arranged.

It should be noted that mirrors or other optical components, such as lenses, may be located between the transmitter or receiver and the satellite test signal reflection apparatus, wherein the optical beam 220 and the reflected optical beam 230 can be guided or deflected by the mirrors in order, for example, to be guided towards the receiver, which can be arranged offset from the transmitter.

Figure 3:
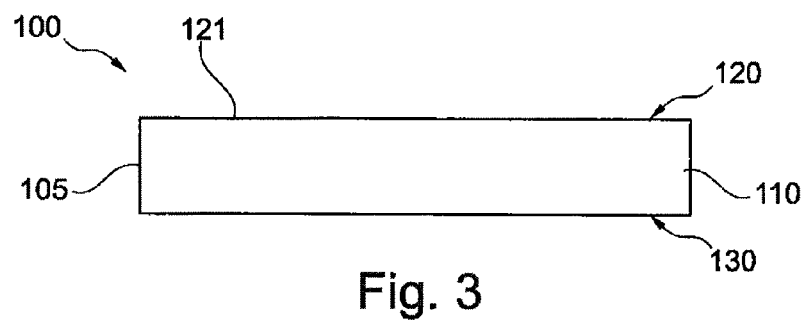
FIG. 3 shows a satellite test signal reflection apparatus according to a further embodiment of the invention.

FIG. 3 shows a satellite test signal reflection apparatus 100, which has a plate 105 with a base 110, a first surface 120 and a second surface 130. The first surface 120 has a residual reflective coating 121.

The residual reflective coating 121 is configured to reflect or transmit an optical signal hitting the first surface 120 or an optical beam hitting the first surface 120 such that the optical power of the reflected optical signal only corresponds to a fraction of the optical power of the optical beam hitting the first surface 120.

Figure 4:
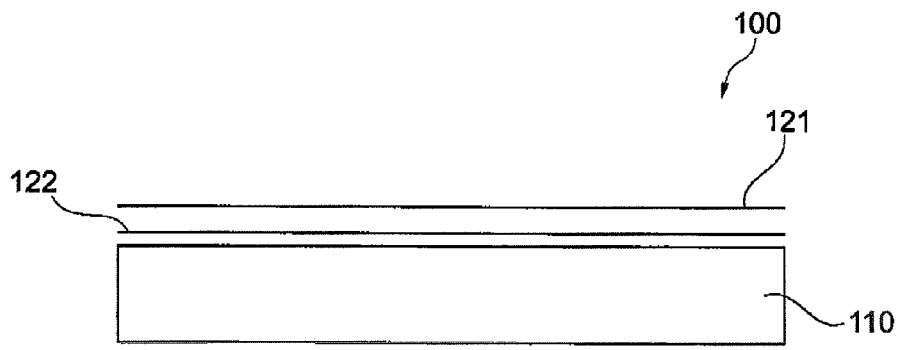
FIG. 4 shows a satellite test signal reflection apparatus according to a further embodiment of the invention.

FIG. 4 shows a satellite test signal reflection apparatus 100 with a base 110, a residual reflective coating 121 and an optically diffusing coating 122.

The optically diffusing coating 122 is arranged between the base 110 and the residual reflective coating 121.

Thus, the coating configured to be optically diffusing 122 allows the diffusion of the beams, which have penetrated the residual reflective coating 121, wherein the optical beams diffused by the optically diffusing coating 122 pass through the base 110 of the satellite test signal reflection apparatus 100.

Figure 5:
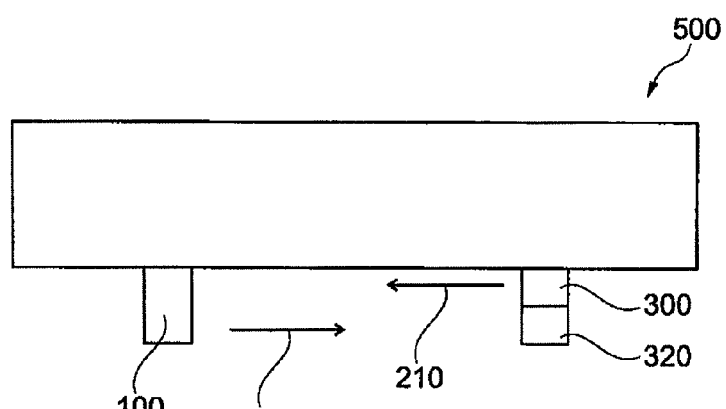
FIG. 5 shows a schematic view of a satellite according to a further embodiment of the invention.

FIG. 5 shows a satellite 500, wherein a transmitter 300, a receiver 320 and a satellite test signal reflection apparatus 100 are arranged on the satellite.

The transmitter 300 exposes the satellite test signal reflection apparatus 100, which can be arranged peripherally on or integrated into the satellite, to an optical beam 210, wherein the satellite test signal reflection apparatus 100 reflects a reflected optical beam 220 with reduced optical power, compared with the optical beam 210, to the receiver 320.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A satellite test signal reflection apparatus for testing transmitters sending out optical signals, the satellite test signal reflection apparatus comprising:
   a plate that is at least partially permeable to optical signals; and
   a shield with an inner surface,
   wherein the plate has a base, a first surface and a second surface,
   wherein the first surface has a residual reflective coating,
   wherein the residual reflective coating is configured to split an optical beam, which penetrates the plate in a first direction from the first surface to the second surface, into a reflected optical beam and a transmitted optical beam,
   wherein the plate is configured to diffuse the transmitted optical beam as the transmitted optical beam leaves the base,
   wherein the shield is arranged such that the inner surface is arranged opposite the second surface of the plate, and
   wherein the inner surface of the shield is configured, at least in one portion, such that the diffused optical beams leaving the plate are reflected back to the plate.

2. The satellite test signal reflection apparatus according to claim 1, wherein the second surface is configured to diffuse light.

3. The satellite test signal reflection apparatus according to claim 1, wherein the base of the plate is configured to be optically diffusing.

4. The satellite test signal reflection apparatus according to claim 1, wherein the plate has an optically diffusing coating.

5. The satellite test signal reflection apparatus according to claim 4, wherein the optically diffusing coating is arranged between the residual reflective coating and the base.

6. The satellite test signal reflection apparatus according to claim 1, wherein the residual reflective coating is configured to reflect less than 10 per mill of an optical power of the optical beam.

7. The satellite test signal reflection apparatus according to claim 6, wherein the residual reflective coating is configured to reflect less than 5 per mill of the optical power of the optical beam.

8. The satellite test signal reflection apparatus according to claim 7, wherein the residual reflective coating is configured to reflect less than 2 per mill of the optical power of the optical beam.

9. The satellite test signal reflection apparatus according to claim 8, wherein the residual reflective coating is configured to reflect 1±0.5 per mill of the optical power of the optical beam.

10. The satellite test signal reflection apparatus according to claim 1, wherein the inner surface of the shield is configured to be optically diffusing at least in one portion.

11. A transmission and reception arrangement for sending optical signals, the transmission and reception arrangement comprising:
    a transmitter;
    a receiver;
    a satellite test signal reflection apparatus, comprising
      a plate that is at least partially permeable to optical signals,
      wherein the plate has a base, a first surface and a second surface,
      wherein the first surface has a residual reflective coating,
      wherein the residual reflective coating is configured to split an optical beam, which penetrates the plate in a first direction from the first surface to the second surface, into a reflected optical beam and a transmitted optical beam, and wherein the plate is configured to diffuse the transmitted optical beam as the transmitted optical beam leaves the base, and a mechanical coupling configured to mechanically couple the transmitter, receiver and the satellite test signal reflection apparatus to each other;

wherein the mechanical coupling is configured to position the satellite test signal reflection apparatus in relation to the transmitter and the receiver in a test position such that an optical signal sent by the transmitter is reflected by the residual reflective coating in a direction of the receiver.

12. The transmission and reception arrangement according to claim 11, wherein the transmitter is configured to send an optical test signal in the test position of the satellite test signal reflection apparatus, wherein the receiver is configured to receive a test signal reflected by the plate;

wherein the transmission and reception arrangement is configured to determine a quality of signal transmission on a basis of the test signal sent and received.

13. The transmission and reception arrangement according to claim 11, further comprising:

a shield with an inner surface, wherein the shield is arranged such that the inner surface is arranged opposite the second surface of the plate, and wherein the inner surface of the shield is configured, at least in one portion, such that the diffused optical beams leaving the plate are reflected back to the plate.

14. The transmission and reception arrangement according to claim 13, wherein the inner surface of the shield is configured to be optically diffusing at least in one portion.

15. The transmission and reception arrangement according to claim 11, wherein the plate has an optically diffusing coating arranged between the residual reflective coating and the base.

16. A satellite, comprising:

a transmitter configured to transmit optical signals;

a receiver configured to receive optical signals;

a satellite test signal reflection apparatus, comprising a plate that is at least partially permeable to optical signals, wherein the plate has a base, a first surface and a second surface, wherein the first surface has a residual reflective coating, wherein the residual reflective coating is configured to split an optical beam, which penetrates the plate in a first direction from the first surface to the second surface, into a reflected optical beam and a transmitted optical beam, and wherein the plate is configured to diffuse the transmitted optical beam as the transmitted optical beam leaves the base, wherein the satellite test signal reflection apparatus is configured, in a test position, to reflect an optical test signal sent by the transmitter so that the receiver receives the reflected optical test signal, wherein the satellite is configured to determine a quality of signal transmission from the transmitter and receiver using the optical test signal sent and the optical test signal received.

17. The satellite according to claim 16, further comprising:

a shield with an inner surface, wherein the shield is arranged such that the inner surface is arranged opposite the second surface of the plate, and wherein the inner surface of the shield is configured, at least in one portion, such that the diffused optical beams leaving the plate are reflected back to the plate.

18. The satellite according to claim 17, wherein the inner surface of the shield is configured to be optically diffusing at least in one portion.

19. The satellite according to claim 16, wherein the plate has an optically diffusing coating arranged between the residual reflective coating and the base.

* * * * *